United States Patent
Klein et al.

(10) Patent No.: US 10,074,099 B2
(45) Date of Patent: *Sep. 11, 2018

(54) INTERNET PROTOCOL MULTI-MEDIA SYSTEM VALUE VOUCHER DISTRIBUTION WITH NETWORK STORAGE AND REDEMPTION

(71) Applicant: AT&T Intellectual Property I, L.P., Atlanta, GA (US)

(72) Inventors: Reuben Klein, East Brunswick, NJ (US); Karen Mullis, Loganville, GA (US); Steven A. Siegel, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 434 days.

This patent is subject to a terminal disclaimer.

(21) Appl. No.: 14/969,427

(22) Filed: Dec. 15, 2015

(65) Prior Publication Data

US 2016/0110771 A1    Apr. 21, 2016

Related U.S. Application Data

(63) Continuation of application No. 13/289,857, filed on Nov. 4, 2011, now Pat. No. 9,330,398.

(51) Int. Cl.
*G06Q 30/00* (2012.01)
*G06Q 30/02* (2012.01)
(Continued)

(52) U.S. Cl.
CPC ..... *G06Q 30/0208* (2013.01); *G06Q 30/0207* (2013.01); *G06Q 30/0239* (2013.01);
(Continued)

(58) Field of Classification Search
None
See application file for complete search history.

(56) References Cited

U.S. PATENT DOCUMENTS 7,769,633 B2 *  8/2010  Jokinen ................. G06Q 30/02
                                                   370/328
9,105,032 B2 *  8/2015  Altberg ................. G06Q 30/02
(Continued)

FOREIGN PATENT DOCUMENTS

WO    WO-2010106554 A2 *  9/2010  .......... G06Q 10/107

OTHER PUBLICATIONS

Peterson et al. Location-Based Advertising The Key to Unlocking the Most Value in the Mobile Advertising and Location-Based Services Markets. (Dec. 2009). http://www.mmaglobal.corn/files/PetersonMobility_20100217144146.pdf Retrieved online Apr. 22, 2018 (Year: 2010).*

(Continued)

*Primary Examiner* — James A Reagan
(74) *Attorney, Agent, or Firm* — Hartman & Citrin LLC

(57) ABSTRACT

A system and method may comprise providing, via a computing device, a connection link to an end user device having a network connectivity access network element; extracting, via an advertisement server, an offer of a value voucher unique to the end user from a database connected to the advertisement server and presenting, through the end user device, an offer of the value voucher to the end user; receiving, via the computing device, from the end user an acceptance of the value voucher; and storing the value voucher in a coupon database in an Internet accessible coupon storage locker unique to the end user.

20 Claims, 4 Drawing Sheets

(51) Int. Cl.
*H04L 29/06* (2006.01)
*H04M 3/428* (2006.01)

(52) U.S. Cl.
CPC ..... *G06Q 30/0267* (2013.01); *G06Q 30/0273* (2013.01); *H04L 65/1006* (2013.01); *H04L 65/1066* (2013.01); *H04M 3/428* (2013.01)

(56) References Cited

U.S. PATENT DOCUMENTS

| | | | |
|---|---|---|---|
| 9,330,398 B2* | 5/2016 | Klein | G06Q 30/0208 |
| 2011/0054993 A1 | 3/2011 | Marshall et al. | |
| 2012/0005026 A1 | 1/2012 | Khan et al. | |
| 2016/0110771 A1* | 4/2016 | Klein | G06Q 30/0208 |
| | | | 705/14.39 |

OTHER PUBLICATIONS

U.S. Office Action dated Jan. 15, 2014 in U.S. Appl. No. 13/289,857.
U.S. Office Action dated Jul. 3, 2014 in U.S. Appl. No. 13/289,857.
U.S. Office Action dated Jan. 27, 2015 in U.S. Appl. No. 13/289,857.
U.S. Notice of Allowance dated Aug. 31, 2015 in U.S. Appl. No. 13/289,857.

* cited by examiner

INTERNET PROTOCOL MULTI-MEDIA SYSTEM VALUE VOUCHER DISTRIBUTION WITH NETWORK STORAGE AND REDEMPTION

CROSS-REFERENCE TO RELATED APPLICATIONS

This application is a continuation of and claims priority to U.S. patent application Ser. No. 13/289,857, entitled "Internet Protocol Multi-Media System Value Voucher Distribution With Network Storage and Redemption," filed Nov. 4, 2011, now U.S. Pat. No. 9,330,398, which is incorporated herein by reference in its entirety.

FIELD

The present application relates to presenting value vouchers, such as reward coupons and representations relating to purchased, offered or rewarded goods or services as part of a telephony session with network storage and redemption of the value voucher.

BACKGROUND

There has been in the art no simple way to incorporate an exchange of a value voucher into a partly or fully automated telephone interaction between a consumer and a vendor, or the like, with respect to transferring some kind of value to the user, including even cash or credit. The disclosed subject matter reduces or eliminates such existing shortcomings in the art.

SUMMARY

A system and method are disclosed which may comprise providing, via a computing device, a connection link to an end user device; extracting, via an advertisement server, responsive to a triggering event, an offer of a value voucher unique to an end user from a database connected to the advertisement server and presenting, through the end user device, the offer of the value voucher to the end user device; receiving from the end user device an acceptance of the value voucher; and storing the value voucher in a coupon database in a network-based accessible coupon storage locker unique to the end user.

DETAILED DESCRIPTION

Figure 1:
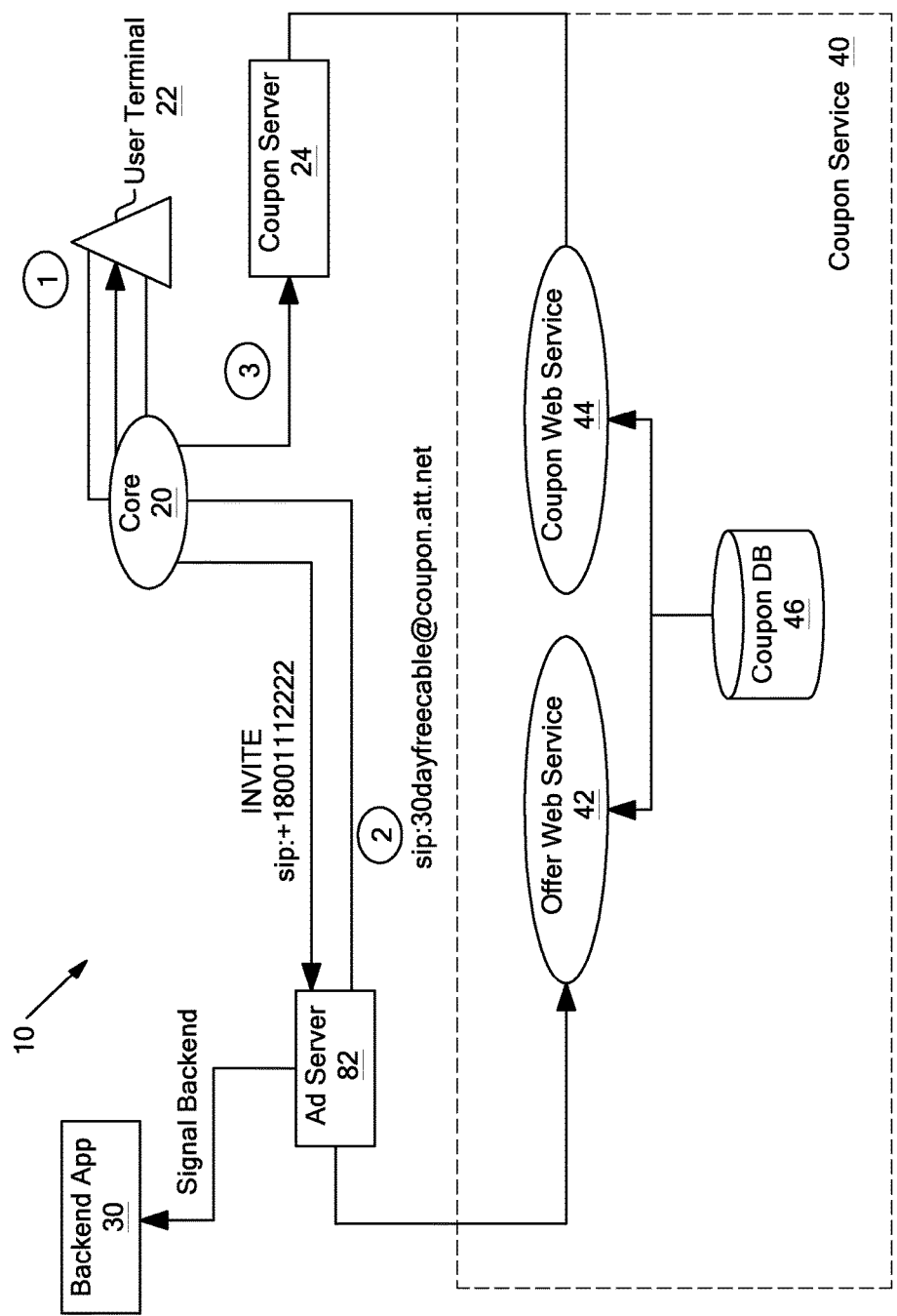
FIG. 1 shows in schematic and partly in block diagram form a value voucher flow according to aspects of embodiments of the disclosed subject matter.

The present disclosure describes presenting promotional offers in an SIP session. According to aspects of the disclosed subject matter, enterprises which are connected for, e.g., Voice over Internet Protocol ("VOIP") connections utilizing session initiation protocol ("SIP") can, e.g., offer coupons directly to users/customers. The end user/customer can call the entity using an SIP connection or over some other calling service (collectively in the present application, communications based on an Internet protocol ("IP") multimedia sub-system ("IMS")) employing SIP or the like to establish and break down the calling service session. The end user/customer may also make connection with the entity's SIP-based communication link from any other device comprising user equipment connected to the telephone network, e.g., including the public switched telephone network ("PSTN").

Session Initiation Protocol (SIP) is an Internet Engineering Task Force ("IETF")-defined signaling protocol widely used for controlling communication sessions such as voice and video calls over Internet Protocol (IP). SIP can be used for creating, modifying and terminating two-party or multiparty sessions. Sessions may consist of one or several media streams. The SIP protocol is an Application Layer ("AL") protocol designed to be independent of the underlying Transport Layer ("TL"). SIP can run on Transmission Control Protocol (TCP), User Datagram Protocol (UDP), or Stream Control Transmission Protocol (SCTP). SIP is a text-based protocol, incorporating many elements of the Hypertext Transfer Protocol (HTTP) and the Simple Mail Transfer Protocol (SMTP).

Often, when consumers call enterprises the consumers must be issued a voucher for some kind of value. This may be, e.g., part of a remedy to a service issue, such as the granting of a return materials authorization ("RMA") to return a product for service or replacement, a schedule of an installation or repair home visit, a voucher to exchange for a product or service, etc. The obtaining of the value could be the purpose of the call itself, e.g., when the consumer is purchasing a good or a service from a vendor.

In other cases, the voucher or coupon may be issued by an automated call attendant, including an automated customer service representative, such as, when the caller has been put on hold for a long period of time. Instead of telling the caller that "Your call is important to us," a more desirable response may be to offer such a caller a voucher for something of value (herein, all of the above collectively referred to as a "value voucher") to compensate the caller for the delay in handling the call, or the need to address any other issue(s) with respect to a transaction with the vendor, such as, late or no delivery, incorrect or incomplete delivery, warranty issues, return request issues, billing issues, etc.

When such activity occurs, the consumer's email address or shipping address, e.g., along with other related information, must be requested by the enterprise, or an agent of the enterprise, and the enterprise or agent must then send the voucher to the consumer by such means or others. An example of such activity relating to a value voucher issuing company might be that if a user/consumer calls a company help line and must be put on hold because all agents are busy. The company may be a user of services provided by a connection provider to connect the end user and the company, such as SIP-based communications links. The call center operator (human or automated) for the company can offer the consumer/user a value voucher coupon to compensate for the inconvenience of having to wait. The coupon could be, e.g., for a period of free service from the company. According to aspects of embodiments of the disclosed subject matter, the management of the offering of, and accepting offers for and storing coupons for customers of such an entity may be offered to the entity as a service provided by the connection provider making the SIP connections.

The consumer/user can be presented the value voucher coupon offer over the consumer/user's phone and the consumer/user can accept the value voucher coupon offer, e.g., as a visual display on a smart phone, as a visual prompt on a cell-phone or other user equipment with graphical capability, or as an audio prompt on other telephony user equipment, e.g., an ordinary telephone. This may also involve automated interactive voice recognition ("IVR") system use. If the consumer accepts the offered coupon, the coupon could be added to the consumer's network-based storage locker for secured storage and later access and redemption. If the consumer does not have a network-based storage locker, the connection provider can allow the consumer to create an account with the connection provider, e.g., the telecommunications network connection provider, providing telephonic connections between an end user/caller and an entity callee, which may be the company ultimately wanting to issue the end user/caller the value voucher. Creating the account and locker during the call also may help pass the time while the end user is on hold.

Value voucher coupons can be offered during an active call with a service agent as well. For example, if a caller is complaining about a shipping error or service interruption, a helpdesk agent, human or automated, can issue a coupon on the spot, through the calling service connection and, if accepted by the user, at the end of or during the call, the value voucher coupon can be stored in the network-based storage locker by using the SIP call session breakdown process. Other aspects of the disclosed subject matter could involve delivery of value to a caller, e.g., extended to, e.g., ticket sales, or other reservation-type transactions, so that a sales agent could, e.g., sell a ticket(s) to a show, sporting event, bus or plane and deposit the ticket(s) in the caller's network locker for later access and redemption, e.g., at the time of the event.

SIP telephony can, as an example, provide a means to incorporate signaling elements into a call. Usually the signaling elements amount to simple information related to media such as a network address and port to be used for an audio or video media stream, or a string of numbers indicating which dial pad buttons the user has pushed, etc. The SIP session defines the context of an information exchange, including the identity of the caller (end user or device) and the routing path that the information takes through a network. According to aspects of the disclosed subject matter, an offer, such as for a value voucher coupon, can be sent to a consumer/user for a network-based coupon or other voucher. This offer, possible acceptance and future storage of the value voucher coupon can be very secure within the SIP communications environment and, thus made unique to the caller/end user and the granting entity and the particular reason for the offer, acceptance and issuance of the value voucher coupon.

As an example, users of an SIP User Agent (one example of a telephony client that can be used) could recognize the signal incorporating the offer and deliver the offer for the coupon to the end user. If the end user accepts the offer, e.g., by actuating a button, which could be, e.g., a number on a numeric dialing pad on the end user client device (which the user may be prompted to do), the coupon can be placed into the end user's network coupon locker. Coupons resulting from such offers and so "clipped" from the telephony session may be indistinguishable from offers "clipped," e.g., from a TV program stream. Offers may be delivered to a browser or other client-based application, such as on a mobile device, such as a smart-phone or tablet, and redeemed in various ways, such as from a merchant point-of-sale ("POS") terminal, or printed on the user's printer, or displayed on the user's cellular phone display, by access to and downloading from the on-line network-based storage locker.

The offers may, e.g., be passed to the user (and stored in the locker of the user) more securely, e.g., by using a secure SIP session and stored in a secure locker. With a network-based storage locker, users can access "clipped" coupons belonging to the users any time, from any point of access place within the Internet ("the cloud") using, e.g., a mobile device with a client application, a browser or the like. An on-line network based coupon locker, such as may be provided by a telecommunications connection provider, can capture the specific terms and conditions in the offer which can include such things as expiration date, source of the offer, limitations on number of uses, etc.

If the offer is printed out, the telecommunications connection provider, e.g., as part of the downloading process from the on-line network-based locker, can place a secure identifier on, e.g., the coupon, e.g., an encrypted identifier, e.g., a unique barcode, so that the offer cannot be shared or used multiple times. Offers can also be redeemed directly, e.g., by using a smart-phone. When the user eventually redeems the value voucher coupon, the issuing company can be billed for the costs involved in the redemption, such as shipping fees, etc., e.g., by the provider of the coupon management system, e.g., a connection provider providing the SIP-based connections.

As this is a secure transaction, the telecommunications connection provider can also provide to the company proof of redemption for non-repudiation purposes. The telecommunications connection provider may also host many interactive voice response (IVR) applications, e.g., ranging from airline reservation systems to voting on American Idol, and the like. This capability can allow for value voucher coupon offers to be embedded directly into the session so that callers can, e.g., be compensated for long delays, or even just encouraged to call in, regardless of waiting time, by the presentation of a coupon by an automated system.

Advertisers, retailers, enterprises, shippers and telecommunications connection providers, therefore, can all benefit from the disclosed subject matter, e.g., through the system and method, as disclosed and claimed, lending the disclosed subject matter to, e.g., automated exchanges of value vouchers of all types as part of an SIP-based, or other secure address-to-address, telephonic communication session. According to aspects of the disclosed subject matter the system and method can be built into, e.g., a call center service or a system for delivering products using a call center as a handling point. As an example, call center application and system developers could incorporate this method into the call center system/service.

Enterprises can, e.g., use such a capability to increase goodwill with customers of the enterprises or to coordinate with third parties, for instance to streamline the process of shipping. Companies participating in such services could be charged a fee, e.g., by the connection provider, such as a per-use royalty or commission, for handling the online transaction, storing the coupon and/or clearing the redemption process. Telecommunication connection providers could offer the disclosed subject matter as a service, e.g., in connection with such products as the VOICETONE® family of products or similar products, such as are offered by telecommunications connection providers.

Figure 2:
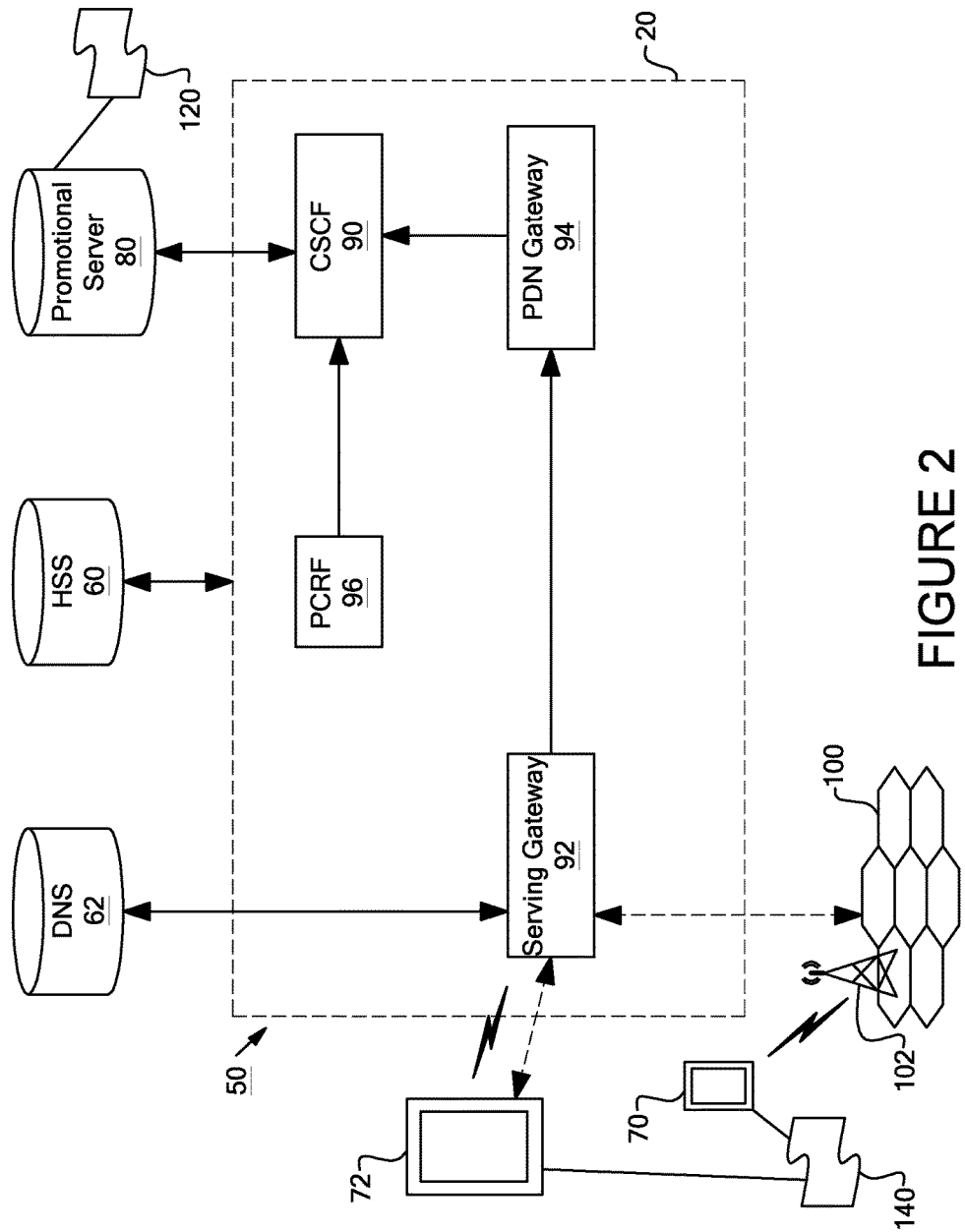
FIG. 2 shows in schematic and partly block diagram form a communications system useful with aspects of embodiments of the disclosed subject matter.

Turning now to FIG. 1 there is illustrated by way of example and partly schematically and in block diagram form, an Internet protocol media system value voucher distribution and storage system 10 according to aspects of an embodiment of the disclosed subject matter. The system 10 may include an SIP communication system core 20. The core 20 may be connected, e.g., through the Internet to a user terminal 22, e.g., a consumer client device (such as a tablet 72 or cellular telephone 70 as shown in FIG. 2), a coupon server 24 (which may also be referred to as a promotional server 80, as shown in FIG. 2) and an advertisement server 82, for communication between and among the user terminal 22, coupon server 24, 80 and the advertisement server 82 over such as SIP-based communication session connections, as explained in more detail below in regard to FIG. 3. It will be understood that the coupon/promotional server 24, 80 and the advertisement server 82 can be one and the same server or two different servers but co-located and under the control of one entity or remotely located and under the control of one entity or remotely located and under the control of different though cooperating entities.

The advertisement server 82 may connect to a backend application 30. The advertisement server 82 may control such things as what advertisements/coupons are available under what circumstances for offer to the consumer/user though the connection to the user terminal 22, what fees to charge the advertiser for presenting the advertisement/coupon, what fees to charge and to whom for the storage in the coupon locker, e.g., within the coupon database 46. The advertisement server 82 and the coupon server 24, 80 may be connected respectively to an offer web service 42 and a coupon web service 44 within a coupon service 40. The offer web service 42 can allow the advertiser/coupon issuer to choose to present to the user a valid offer, e.g., for a value voucher (coupon). The coupon web service 44 can allow the consumer to "clip" a value voucher (coupon), e.g., to claim the specific coupon and later redeem the coupon for value. The offer web service 42 and coupon web service 44 may be under the control of one or more servers (not shown) each or a single server (not shown). The offer web service 42 and coupon web service 44 may be connected to one or more databases, such as a coupon database 46.

Turning now to FIG. 2, there is depicted by way of example, an illustrative embodiment of a communication system 50, which can, e.g., employ an Internet protocol ("IP") Multimedia Subsystem ("IMS") network core architecture 20. The core architecture 20 can facilitate, as an example, combined services of circuit-switched and packet-switched systems. The communication system core 20 can be overlaid upon or operably coupled within a larger communication system as a representative embodiment of such a communication system.

Communication system core 20 can communicate with a Home Subscriber Server ("HSS") 60, and other common network elements of an IMS network core 20. The IMS network core 20 can establish communications between IMS-compliant communication devices ("CDs"),e.g., cellular telephone 70, and tablet 72, or other user terminal 22 (shown on FIG. 1), and external computing services, such as promotional/coupon server 24, 80, performing functionalities 120, and advertisement server 82 (FIG. 1), each accessible, e.g., on an external packet data network. The IMS core 20 can also connect to other than IMS compliant communication devices, through the telephone network, including circuit-switched and packet-switched systems.

IMS CDs 22, 70, 72 can register with the IMS network core 20 by contacting Call Session Control Function ("CSCF") 90, e.g., through a serving gateway 92 and a PDN gateway 94. The CSCF 90 communicates with the HSS 60 in order to register the CDs 22, 70, 72. To initiate a communication session between an originating IMS CD 22, 70, 72 and, as an example, the coupon/promotional Server 24, 80, the CD 22, 70, 72 can submit, e.g., an SIP message to the originating CSCF 90, e.g., an INVITE message (such as 202 in FIG. 3). The CSCF 90 communicates with a corresponding Serving Gateway 92 through the PDN gateway 94. A Call Session Control Function (CSCF) 90 is a central component to signaling and control within an IP Multimedia Subsystem (IMS) network. Subdivided into three separate parts, the CSCF 90 is responsible for all signaling via Session Initiation Protocol (SIP) between the Transport Plane, Control Plane, and the Application Plane of the IMS. The CSCF 90 can consist of a Proxy CSCF (P-CSCF), Interrogating CSCF (I-CSCF), and the Serving CSCF (S-CSCF), which each have unique functions within an IMS.

ACSCF 90 within SIP as part of VOIP can be seen as responsible for interfacing directly with Transport Plane components and the first point of signaling within an IMS for any given end-point, transmitter or receiver, e.g., IMS CDs 22, 70, 72 or related servers 24, 80, 82, etc. Once an endpoint such as a mobile phone 70 connection is made with an IP connectivity access network (IP-CAN) network element (not shown), such as through a Serving Gateway 92, a GPRS support node (GGSN) (not shown) acquires IP connectivity. The end point 22, 70, 72 registration event occurs by first signaling to the CSCF 90. The IP-CAN will discover the CSCF 90 via IP-CAN's own mechanism or via a dynamic host configuration protocol ("DHCP"). DHCP is a network configuration protocol for hosts on Internet protocol ("IP") networks.

Computing devices and communication devices that are connected to IP networks are configured before the computing device and communication devices can communicate with other hosts. This requires, e.g., an IP address and a default route and routing prefix. DHCP can eliminate manual configuration, e.g., by a network administrator, and can provide a central database of devices that are connected to the network and eliminate duplicate resource assignments.

The CSCF 90 can be seen to act as a proxy for all SIP messages from end-points, e.g., IMS CDs 22, 70, 72 and connected servers, e.g., 24, 80, 82, etc., to the rest of the IMS network. The CSCF 90 is usually in a home network, but may reside in a visited network. The CSCF can use the domain name service ("DNS") 62 to look up what CSCF to send the SIP message to, which could be a CSCF in the CSCF's own network or another CSCF across an administrative domain.

The CSCF 90 can also be seen as responsible for policy decisions, e.g., either using another IMS component, e.g., an embedded policy decision function ("PDF") (Release 5 of IMS) or a common open policy service ("COPS") protocol to communicate with a standalone PDF (Release 6 of IMS), or interface via the Diameter protocol to the policy charging, and resource function ("PCRF") 96 as an alternative standalone network element (Release 7 of IMS). The IP-CAN network elements such as the GGSN can act as a policy enforcement point ("PEP"), e.g., to establish a certain amount of bandwidth to be made available to a mobile phone 70 when GGSN seeks to establish a session. In a device to device session, each CSCF (on each end point of the session)

can make policy decisions for the session, which will be controlled by attributes set in the session description protocol ("SDP").

The Terminating S-CSCF 204 (FIG. 3) can be seen as responsible for routing all SIP messages to allow for control plane session ("CPS") control to interact with the application plane ("AP") application logic. To do this the terminating S-CSCF 204 can use information obtained from the HSS 60 in the form of initial filter criteria ("IFC") that can act against inbound session establishment requests. The IFC can include rules that define how and where SIP messages should be routed in the application plane.

Once authorized, the serving gateway 92 can communicate with an appropriate packet data network ("PDN") gateway 94 to route the HTTP request to the HTTP request's destination, which can include another IMS CD, and also a server, e.g., the coupon/promotional server 24, 80. The PDN Gateway 94, in turn, can query a policy and charging rules function ("PCRF") 96 in order to determine if the HTTP request is valid, chargeable to a subscriber and does not exceed the authorized usage maximum established for the subscriber. Additionally, the PDN gateway 94 can reference a domain name service ("DNS") 62, e.g., to acquire the IP address of a requested destination, such as another IMS CD 22, 70, 72, or a server, e.g., the coupon/promotional server 24, 80, or the advertisement server 82 and route the request accordingly.

In addition, the communication system core 20 can be adapted to provide the IMS CDs 22, 70, 72 with the multimedia and Internet services of the broader communication system 50. It will be further appreciated that the IMS CDs 22, 70, 72 of FIGS. 1 and 2 can operate as wire-line (22) or wireless (70, 72) devices. For example, the CDs 70, 72 of FIG. 2 can be communicatively coupled to a cellular base station network 100, through a base station 102, a femtocell, a WiFi router, a DECT base unit, or another suitable wireless access unit to establish communications with the IMS network 20 of FIG. 2. An originator can operate according to common wireless access protocols such as global system for mobile ("GSM"), code division multiple access ("CDMA"), time division multiple access ("TDMA"), frequency division multiple access ("FDMA"), universal mobile telecommunications ("UMTS"), world interoperability for microwave ("WiMAX"), software defined radio ("SDR"), long term evolution ("LTE"), and so on.

Other present and next generation wireless network technologies are contemplated by the present disclosure. Accordingly, multiple wire-line and wireless communication technologies are contemplated for the CDs 22, 70, 72 of FIGS. 1 and 2. The coupon/promotional server 24, 80 of FIGS. 1 and 2 can be operably coupled to a second communication system 50 (not shown) for purposes similar to those described above. It is further contemplated by the present disclosure that coupon/promotional server 24, 80 can perform applications/functions 120 and thereby provide, e.g., coupon/promotional services to the CDs 22, 70, 72, of FIGS. 1 and 2. CDs 22, 70, 72 can be adapted with software to perform applications/functions 140, e.g., to utilize the services of the coupon/promotional server 80.

Figure 3:
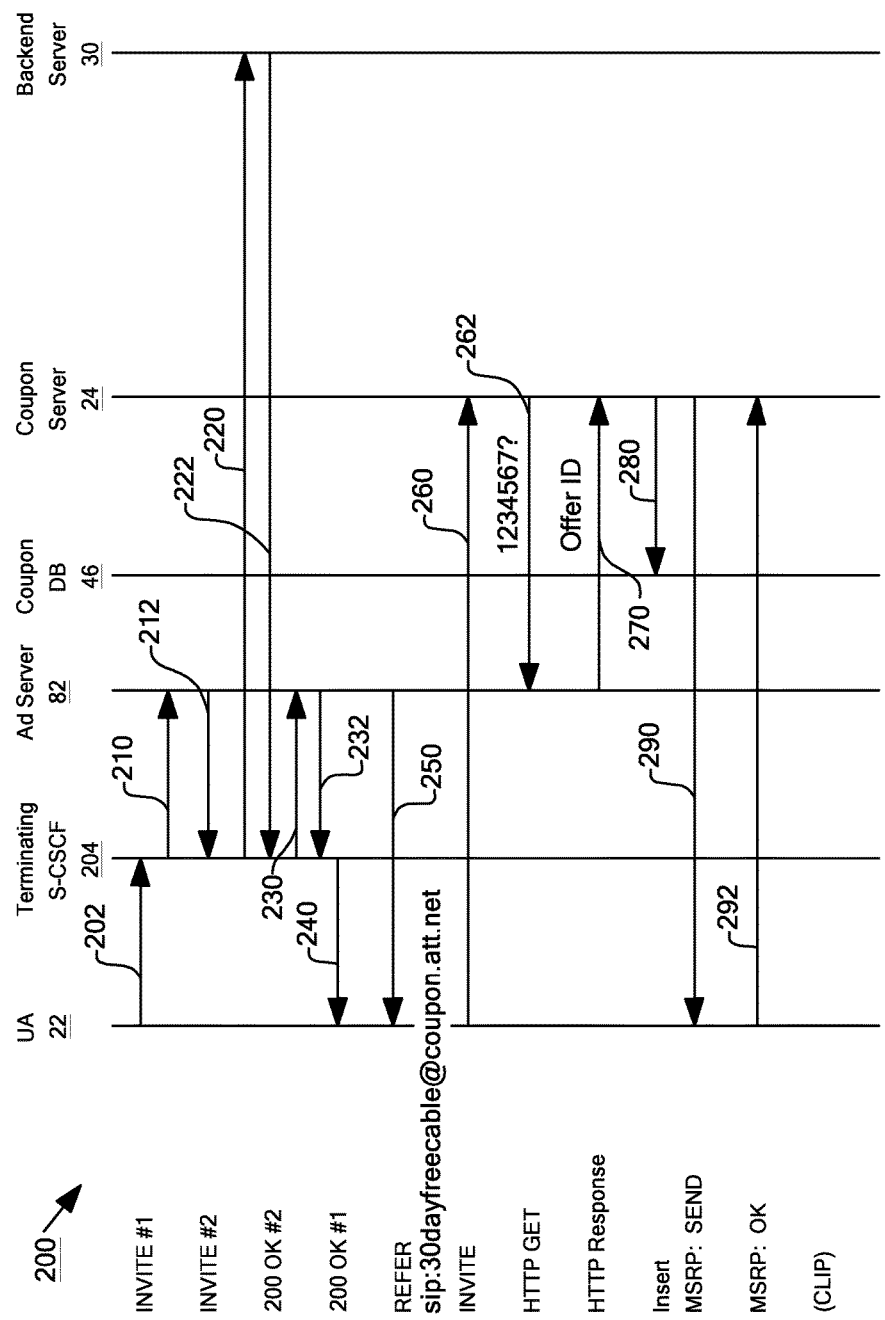
FIG. 3 shows in schematic and partly block diagram form a value voucher call flow according to aspects of embodiments of the disclosed subject matter.

Turning now to FIG. 3 there is shown a diagram of a call flow for multiple SIP sessions 200 according to aspects of an embodiment of the disclosed subject matter. Initiating the first of the SIP sessions 200, the user terminal 22 can attempt to initiate an SIP session, e.g., with the advertisement server 82, with a first INVITE message 202. This first SIP session using the SIP protocols may be initiated by, e.g., a customer service agent, automated or human, while a call is being processed from a customer. Initially, a user agent ("UA"), e.g., at a user terminal 22, as shown in FIG. 1, can initiate a call, such as a voice over Internet protocol call, using SIP messaging. This call, illustrated by 1 in a circle in FIG. 1, can include a first SIP INVITE message 202, e.g., sip:+18001112222 (FIGS. 1 and 3). The INVITE message 202 (FIG. 3) may be initiated through a terminating S-CSCF (not shown in FIG. 3) for the user terminal 22. The UA 22 as illustrated in FIG. 3 is the end user customer, e.g., calling in to a call center and accessing a call center agent (human or automatic), e.g., who is dealing with the end user over a session-based telecommunications connection, such as a voice over Internet protocol, telecommunications session or any other connection, such as through the regular public switched telephone network ("PSTN").

The first INVITE message 202 can be seen to be a message, such as, that an SIP endpoint needs to send in order to establish a call, including, e.g., an SIP URI or TEL URI for the originating side, and with the callee having either an IMS Public User Identity (IMPU) or PSI. An SIP URI or TEL URI exists for the UA 22 sender on the originating side and an IMS Public User Identity ("IMPU") or PSI exists for terminating users and the IMPU user ID for the recipient on the terminating side, such as, the advertisement server 82 is used. The first INVITE message 202 can be received by a terminating S-CSCF 204 for the advertisement server 82, which can route the INVITE message 210 to the advertisement server 82. At a later time, the terminating S-CSCF 204 can receive back a response 232 to the first INVITE message 210.

The terminating S-CSCF 204 can receive a second INVITE message 212 from the advertisement server 82 directed to the backend application server 30. This second INVITE message 212 can initiate a second SIP session. The terminating S-CSCF 204 can direct the second INVITE message 220 to the backend server 30 and receive a response 222, e.g., in order to acquire a URI for the end user 22, such as for an intended recipient of a REFER message 250, such as, "30 dayfree@coupon.att.com". The backend server 30 response may include a second 200 OK message 222 back to the S-CSCF. The terminating S-CSCF 204 may then forward the second 200 OK message 222 to send a message 230 to the advertisement server 82 to extract a voucher offer for the end user on the user terminal 22. The S-CSCF 204 can then send a first 200 OK message 240 to the user agent 22.

The backend server 30 may not be controlled by the connection provider, but may, instead be at a customer run SIP application server. The backend server 30 may be monitoring some aspect of the end user call, such as that the caller is waiting on hold. The back end server 30 may, further, apply some selected business rules (e.g., a set of identified triggering events) to determine if an advertisement (e.g., a value voucher of some kind) should be made available for the user on the user terminal 22. The logic may simply be to approve the request for such a voucher made by a service representative or may further involve the use of some information concerning the end user on the end user terminal 22, apart from simply the identification of the user terminal 22. This information could be, e.g., that the user has been on hold for more than some selected threshold time, that the user has ordered a product or service, that the user has some complaint about a product or a service, etc.

After the terminating S-CSCF 204 routes the message 230, including, e.g., the second 200 OK message, to the advertisement server 82, the advertisement server 82 can now setup the original call and send the first 200 OK response message 232 responsive to the original INVITE message 202. The terminating S-CSCF 204 forwards the first 200 OK message to the UA 22 in a message 240 response to the UA 22 original caller.

At some point, however, the advertisement server 82 can, e.g., decide the user 22 has been or was on hold for too long and then send the user 22 a REFER message 250, referencing the value voucher coupon offer in the message 250, e.g. the SIP:30 dayfree@coupon.att.com.

The end user's terminal 22 can then respond by issuing another INVITE message 260 to the coupon server 24, which may be in the control of the telephonic communications connection provider. When the coupon server 24 receives the INVITE message 260, e.g., for "30dayfree," to the coupon server 24, the coupon server 24 can then send an HTTP request "HTTP GET" message 262 to the advertisement server 82, which may contain a coded market ID and offer code, e.g., 1234567? as shown in FIG. 3.

The advertisement server 82 can then respond to the request with a message 270 to the coupon server 24, which may include an ID which identifies the actual value voucher coupon to be "clipped" by the end user 22. The coupon server 24 can then do a Database Insert 280 to place the coupon offer ID into the user's unique locker in the coupon database 46. The coupon server 24 can then send the user an MSRP SEND message 290 saying, e.g., "Sorry for keeping you on hold so long. We have issued you a coupon for 30 days free service!" The end user terminal 22 can then respond to the coupon server 24, e.g., by sending an OK message 292 to the coupon server 24 when the end user terminal 22 receives the MSRP message 290, as indicated by 3 in a circle in FIG. 1. The OK message 292 can constitute the end user "clipping" the coupon, such that the value voucher coupon is ready in the coupon database 24 in the end user's unique coupon locker for the end user 22 to address in order to redeem the value voucher coupon.

In computer networking, a Message Session Relay Protocol ("MSRP") is a protocol that can be used for transmitting, e.g., a series of related instant messages in the context of a communications session, such as a voice over Internet protocol communication, e.g., with an application instantiating the session with SIP or other rendezvous methods. MSRP messages can also be transmitted by using intermediaries such as peers, e.g., by using relay extensions. MSRP can be used in a rich communications suite ("RCS") context, especially for the Instant Messaging, File Transfer and Image Sharing features.

Figure 4:
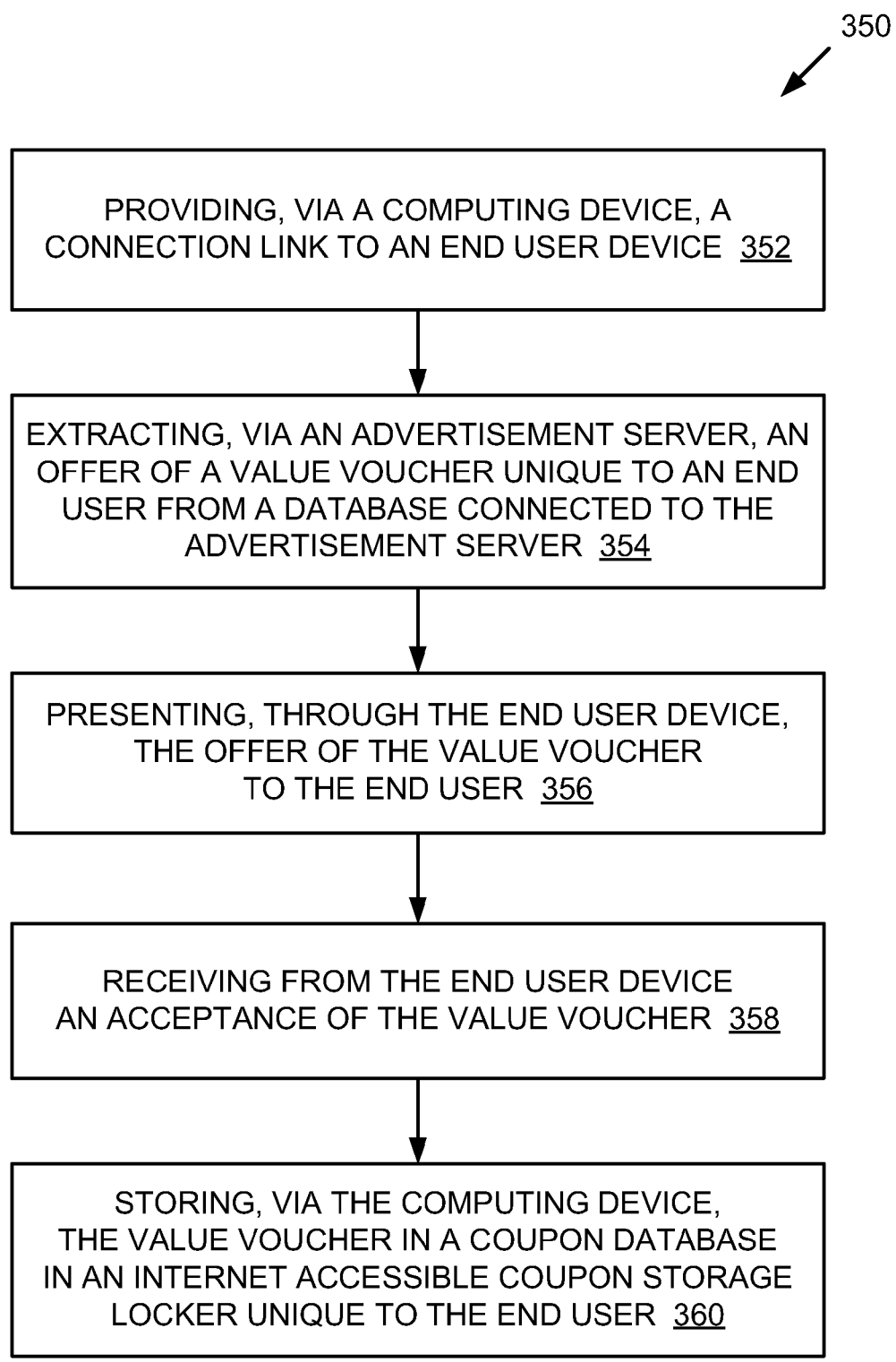
FIG. 4 is a flow diagram showing aspects of a method for presenting, receiving acceptance of, and storing a value voucher, according to an illustrative embodiment of the concepts and technologies described herein.

Turning now to FIG. 4 there is shown a flow diagram for a process 350 according to aspects of an embodiment of the disclosed subject matter. In block 352, the process 350 can implement the step of providing, via a computing device, a connection link to an end user device. The end user device can have an Internet connectivity access network element. The step of block 354 can be extracting, via an advertisement server, an offer of a value voucher unique to the end user from a database connected to the advertisement server. Step 356 can be presenting, through the end user device, the value voucher to the end user. Block 358 contains the step of receiving, via the computing device, from the end user an acceptance of the value voucher. Block 360 involves storing, via the computing device, the value voucher in a coupon database in an Internet accessible coupon storage locker unique to the end user.

Therefore, according to aspects of embodiments of the disclosed subject matter a reward, such as a value voucher coupon offer, can be sent to an end user engaged in telephonic communication to an enterprise that is using IMS, e.g., through a service provider or connection provider, or both, through SIP-based messages with the end user terminal being an SIP multimedia device. The value voucher (coupon) could be accepted by the end user customer using, e.g., voice or DTMF-like signaling, and then placed in an on-line coupon locker unique to the end user. The locker could be, e.g., in the coupon database 46.

The end user can then send a message, or otherwise communicate with the coupon database 46, e.g., on-line through the Coupon Web-Service 44, e.g., using HTTP, in order to retrieve the actual coupon from the coupon database 46 where the actual coupon was deposited in the locker. The coupon is specific to a customer, and is placed in the customer's unique network-based coupon locker. Thus a human customer service representative could, as a triggering event, initiate the coupon transaction to get the offer of a coupon through the advertisement database, offer the coupon to the end user through the end user device, and have the coupon, once accepted by the end user, stored in the locker unique to the end user. Automated logic within an automated customer service representative application or other backend application, e.g., monitoring how long the end user is placed on hold in communicating with the company providing the reward value voucher (coupon), could also initiate the triggering event.

As examples of possible triggering events that automated logic or human operators may be arranged to detect or to initiate, and, therefore, start the coupon issuing process noted above, could be, e.g., length of time on hold on a call to the coupon-issuing company, a dropped call to the company, service usage thresholds, e.g., for IMS or IMS-accessed services, a response by IMS to a coupon offer or a request with a coupon as an incentive, e.g., answering a poll, voting using IMS (e.g. American Idol), reporting a network problem, a customer service representative response to a customer or an automated IVR response from a customer, as just noted above, etc.

It will be understood by those skilled in the art that a system and method are disclosed in the present application which may comprise providing, via a computing device, a connection to an end user device; responsive to a triggering event, e.g., relating to communication by the end user over the communication connection, extracting, via an advertisement server, an offer of a value voucher unique to the end user from a database connected to the advertisement server and presenting, through the communication connection, e.g., the end user device, an offer of the value voucher to the end user; receiving, via the computing device, from the end user an acceptance of the value voucher; and storing the value voucher in a coupon database in an Internet accessible coupon storage locker unique to the end user.

The communication connection may be a part of an Internet protocol multi-media sub-system, which may employ session initiation protocol messaging. The communication connection is known to be connected to a particular coupon issuing entity identified, e.g., by an IMPU or TEL URI, and thus can securely offer value vouchers to and provide accepted value vouchers to the identified end user. The system can also address the value voucher coupon to an Internet locker that can also be uniquely identified to the end user.

The system and method may further comprise connecting the end user device to a value voucher issuing entity, which may be connected to the Internet protocol multi-media subsystem through a registered entity endpoint utilizing session initiation protocol messaging. The user communication connection, end user device, may comprise a user client device, such as one of a smart phone, a portable computing device, a personal digital assistant and a mobile phone. The end user device may have other unique end user identifiers, such as a telephone number. Thus, the value voucher issuing entity can identify the recipient of the offer and of the accepted value voucher coupon.

The system and method may also comprise providing the end user device or other internet capable end user application, such as a browser, with access to the coupon storage locker uniquely identified with the end user for redemption of the value voucher. The value voucher may be stored in the storage locker utilizing a session initiation protocol session breakdown process, which can again provide security and certainty as to the identity of the end user entitled to the value voucher and "owning" the Internet accessible locker where the coupon is stored for later access and redemption. The system and method may also comprise a tangible machine readable medium storing instructions that, when executed by a computing device, cause the computing device to perform the method just noted.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completed programmable or pre-programmed logic circuitry, such as a controller or microcontroller, a digital signal processor, or any other form of device that can fetch instructions, operate on pre-loaded/pre-programmed instructions, to carry out logic operations that, together, perform steps of and whole processes and functionalities as described in the present disclosure.

The data processing device may be formed by customized logic or by application specific integrated circuit ("ASIC") logic such as gate arrays or standard cells or the like implementing customized logic on the base ASIC architecture. The interconnect may connect the data processing device(s) to memory. The interconnect may be internal to the data processing device(s), such as coupling a microprocessor to on board cache memory or external memory such as main memory, or a disk drive. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The interconnect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller can include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system. All of the above, being considered to be both tangible and storing in a non-transitory fashion instructions that are executed by a computing device.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and functions. Servers may be remotely located and interconnected over wired or wireless inter-connections, including through the Internet. For purposes of the present application, a server may be considered to include multiple servers performing multiple functionalities along with one or more computing devices, and the entire system may constitute a single computing device acting as one integral computing device for performing functions including data processing, database access and management and the like.

In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the disclosed subject matter.

In one embodiment, a user terminal can be a computing device, such as in the form of a PDA, a cellular phone, a smart phone, a phone having Internet communication and application connectivity, such as a Blackberry® or Droid®, a notebook computer, a personal computer, such as a desktop or desk side computer, etc. Alternatively, traditional communication client(s) may be used in some embodiments of the present invention.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

In various embodiments, hardwired circuitry, such as an ASIC(s), may be used in combination with software instructions to implement an aspect(s) of the disclosed subject matter. Thus, the techniques are not limited to any specific combination of hardware circuitry and software nor to any particular source for the instructions executed by any part of the computing device(s). Various functions and operations which have been described as being performed by or caused by software code to simplify description, will be understood by those skilled in the art to mean the function(s) and results from execution of the code by a processor(s), as a computing device or part of a computing device.

Although some of the drawings may illustrate a number of operations in a particular order, operations which are not order dependent may be reordered and other operations may be combined or broken out. While some reordering or other groupings may have been specifically mentioned, others will be apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located at least in part from each other. The disclosed subject matter has been described with reference to one or more specific exemplary embodiments thereof. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense.

What is claimed:

1. A method comprising:
  receiving, at a computer processor that executes a terminating call session control function, a first session initiation protocol invite message indicating initiation of a connection link with an end user device, wherein the first session initiation protocol invite message is received from a device associated with a user agent during an active call between the end user device and the device;
  routing, by the computing device and in response to receiving the first session initiation protocol invite message, the first session initiation protocol invite message to an advertisement server;
  receiving, by the terminating call session control function, a second session initiation protocol invite message from the advertisement server;
  directing, by the terminating call session control function, the second session initiation protocol invite message to a backend application server to instruct the backend application server to acquire a uniform resource indicator for the end user device;
  receiving, by the terminating call session control function and from the backend application server, an acknowledgement of the second session initiation protocol invite message;
  routing, by the terminating call session control function, the acknowledgement to the advertisement server to instruct the advertisement server to extract an offer of a value voucher from an application server, the value voucher being unique to an end user associated with the end user device;
  transmitting, by the terminating call session control function, the offer of the value voucher to the end user device;
  receiving, at the terminating call session control function, an indication that the end user device has accepted the value voucher;
  determining, by the terminating call session control function during the active call, that an account associated with the user does not exist;
  in response to determining that the account associated with the user does not exist, creating, by the terminating call session control function during the active call, the account associated with the user and a network-based storage locker; and
  instructing, by the terminating call session control function and in response to receiving the indication that the end user device has accepted the value voucher, a coupon server to store, during the active call, the value voucher in the network-based storage locker unique to the user and to inform the end user device that the value voucher has been stored.

2. The method of claim 1, further comprising:
  providing the end user device with access to the network-based storage locker to enable redemption of the value voucher by the end user device.

3. The method of claim 1, wherein the coupon server is associated with an Internet protocol multimedia subsystem.

4. The method of claim 1, wherein the end user device comprises a cellular phone.

5. The method of claim 1, wherein the value voucher is offered based on the end user device being on hold during the active call.

6. The method of claim 1, wherein the end user device comprises a smart phone.

7. The method of claim 1, further comprising:
  detecting redemption of the value voucher; and
  billing an issuing company for costs associated with the redemption of the value voucher.

8. A system comprising:
  a computer processor; and
  a memory that stores instructions that, when executed by the computer processor, cause the computer processor to perform operations comprising
    receiving, by a terminating call session control function, a first session initiation protocol invite message indicating initiation of a connection link with an end user device, wherein the first session initiation protocol invite message is received from a device associated with a user agent during an active call between the end user device and the device,
    routing, by the terminating call session control function and in response to receiving the first session initiation protocol invite message, the first session initiation protocol invite message to an advertisement server,
    receiving, by the terminating call session control function, a second session initiation protocol invite message from the advertisement server,
    directing, by the terminating call session control function, the second session initiation protocol invite message to a backend application server to instruct the backend application server to acquire a uniform resource indicator for the end user device, receiving, by the terminating call session control function and from the backend application server, an acknowledgement of the second session initiation protocol invite message, routing, by the terminating call session control function, the acknowledgement to the advertisement server to instruct the advertisement server to extract an offer of a value voucher from an application server, the value voucher being unique to an end user associated with the end user device, transmitting, by the terminating call session control function, the offer of the value voucher to the end user device for acceptance, receiving, by the terminating call session control function, an indication that the end user device has accepted the value voucher, determining, by the terminating call session control function during the active call, that an account associated with the user does not exist;

in response to determining that the account associated with the user does not exist, creating, by the terminating call session control function during the active call, the account associated with the user and a network-based storage locker, and instructing, by the terminating call session control function and in response to receiving the indication that the end user device has accepted the value voucher, a coupon server to store, during the active call, the value voucher in the network-based storage locker unique to the user and to inform the end user device that the value voucher has been stored.

9. The system of claim 8, wherein the instructions, when executed by the processor, cause the processor to perform operations further comprising:
providing the end user device with access to the network-based storage locker to enable redemption of the value voucher by the end user device.

10. The system of claim 8, wherein the value voucher is offered based on the end user device being on hold during the active call.

11. The system of claim 8, wherein the coupon server is associated with an Internet protocol multimedia subsystem.

12. The system of claim 8, wherein the end user device comprises a cellular phone.

13. The system of claim 8, wherein the end user device comprises a smart phone.

14. The system of claim 8, wherein the instructions, when executed by the processor, cause the processor to perform operations further comprising:
detecting redemption of the value voucher; and
billing an issuing company for costs associated with the redemption of the value voucher.

15. A non-transitory computer-readable medium that stores instructions that, when executed by a computer processor, cause the computer processor to perform operations comprising:
receiving, by a terminating call session control function, a first session initiation protocol invite message indicating initiation of a connection link with an end user device, wherein the first session initiation protocol invite message is received from a device associated with a user agent;
routing, by the terminating call session control function and in response to receiving the first session initiation protocol invite message, the first session initiation protocol invite message to an advertisement server;
receiving, by the terminating call session control function, a second session initiation protocol invite message from the advertisement server;
directing, by the terminating call session control function, the second session initiation protocol invite message to a backend application server to instruct the backend application server to acquire a uniform resource indicator for the end user device;
receiving, by the terminating call session control function and from the backend application server, an acknowledgement of the second session initiation protocol invite message;
routing, by the terminating call session control function, the acknowledgement to the advertisement server to instruct the advertisement server to extract an offer of a value voucher from an application server, the value voucher being unique to an end user associated with the end user device;
transmitting, by the terminating call session control function, the offer of the value voucher to the end user device for acceptance;
receiving, by the terminating call session control function, an indication that the end user device has accepted the value voucher; and
determining, by the terminating call session control function during an active call, that an account associated with the user does not exist;
in response to determining that the account associated with the user does not exist, creating, by the terminating call session control function during the active call, the account associated with the user and a network-based storage locker;
instructing, by the terminating call session control function and in response to receiving the indication that the end user device has accepted the value voucher, a coupon server to store the value voucher in a network-based storage locker unique to the user and to inform the end user device that the value voucher has been stored.

16. The non-transitory computer-readable medium of claim 15, wherein the instructions, when executed by the processor, cause the processor to perform operations further comprising:
providing the end user device with access to the network-based storage locker to enable redemption of the value voucher by the end user device.

17. The non-transitory computer-readable medium of claim 15, wherein the coupon server is associated with an Internet protocol multimedia subsystem.

18. The non-transitory computer-readable medium of claim 15, wherein the end user device comprises a cellular phone.

19. The non-transitory computer-readable medium of claim 15, wherein the value voucher is offered based on the end user device being on hold during the active call.

20. The non-transitory computer-readable medium of claim 15, wherein the instructions, when executed by the processor, cause the processor to perform operations further comprising:
detecting redemption of the value voucher; and
billing an issuing company for costs associated with the redemption of the value voucher.

* * * * *